United States Patent [19]

An et al.

[11] 4,236,085

[45] Nov. 25, 1980

[54] METHOD FOR PRODUCING TRIGGER PULSES IN RELATION TO PRESET PHASE OF MOTION PROCEEDING WITH CONTINUOUSLY VARIABLE PERIOD AND DEVICE FOR EFFECTING SAME

[76] Inventors: Viktor B. An, rabochy poselok Krasnoobsk, dom 3, kv. 5; Ivan D. Bukhtiarov, rabochy poselok Krasnoobsk, dom 3, kv. 157; Alexei S. Demin, rabochy poselok Krasnoobsk, dom 6, kv. 198; Veniamin G. Potanin, rabochy poselok Krasnoobsk, dom 3, kv. 12, all of Novosibirskaya oblast; Valery A. Spelchuk, proezd Dzerzhinskogo, dom 69, kv. 79, Novosibirsk, all of U.S.S.R.

[21] Appl. No.: 967,271

[22] Filed: Dec. 7, 1978

[30] Foreign Application Priority Data

Dec. 15, 1977 [SU] U.S.S.R. .............................. 2555285
Jan. 12, 1978 [SU] U.S.S.R. .............................. 2571116

[51] Int. Cl.$^2$ .............................................. F02P 5/04
[52] U.S. Cl. .................................... 307/106; 123/416; 123/487
[58] Field of Search .................... 307/106; 315/209 T; 123/32 EB, 32 EC, 148 E, 117 D

[56] References Cited

U.S. PATENT DOCUMENTS

| 3,908,616 | 9/1975 | Sasayama | 123/32 EC X |
| 4,082,069 | 4/1978 | Mayer | 123/32 EB X |
| 4,140,083 | 2/1979 | Frobenius | 123/32 EB X |

*Primary Examiner*—L. T. Hix
*Assistant Examiner*—James L. Dwyer
*Attorney, Agent, or Firm*—Steinberg and Blake

[57] ABSTRACT

A method for producing trigger pulses in relation to a preset phase of motion proceeding with a continuously variable period, whereby pulses are accumulated, and at the same time two time intervals are successively determined within the fundamental time interval as the phase of the motion is changed by a preset value. The durations of these two time intervals and the sign of the difference between them are used to correct the number of stored pulses which are counted until a preset number is reached, which moment marks the onset of a trigger pulse. The device for effecting this method comprises a unit for determining the difference between time intervals and correcting the fundamental time interval, which is connected to a control unit, a main pulse counter and a main controlled frequency divider connected, in turn, to a pulse generator. The control unit is connected to a control pulse unit and an initial adjustment unit.

2 Claims, 6 Drawing Figures

METHOD FOR PRODUCING TRIGGER PULSES IN RELATION TO PRESET PHASE OF MOTION PROCEEDING WITH CONTINUOUSLY VARIABLE PERIOD AND DEVICE FOR EFFECTING SAME

FIELD OF THE INVENTION

The present invention relates to automotive engineering and, more particularly, to methods and devices for producing trigger pulses in relation to a preset phase of motion proceeding with a continuously variable period.

The method and device of this invention are readily applicable to fuel injection and ignition timing in internal combination engines.

BACKGROUND OF THE INVENTION

The No 1 characteristic of the automotive market today is the demand for reliable and economical vehicles. Health authorities the world over are imposing strict limitations on the toxicity of exhaust gases. These factors account for stringent requirements imposed on individual units and systems of vehicles, including the ignition and fuel injection systems. However, it is impossible to produce better vehicles only by improving the existing mechanical ignition distributors and fuel injection systems. The solution to the problem seems to be the use of electronic trigger pulse systems.

There is known a method for producing trigger pulses in relation to a preset phase of motion proceeding with a constantly variable period (cf. U.S. Patent No. 3,934,563), whereby a first control pulse is formed as a preset phase of the motion is reached, a second control pulse is formed as the phase of the motion is changed by a preset value which corresponds to a fundamental time interval, and pulses are accumulated, whereof the repetition frequency is at least one order greater than that of the control pulses, whereupon the accumulated pulses are counted until a preset number is reached, which moment marks the onset of a trigger pulse.

There is known a device for producing trigger pulses in relation to a preset phase of motion proceeding with a constantly variable period. The device is intended to carry out the foregoing method and comprises a control unit having its inputs connected to an initial adjustment pulse unit and a control pulse unit, whereas outputs of the control unit are connected to a main pulse counter and a main controlled frequency divider, respectively, which are interconnected. The main pulse counter has its output connected to a comparator. The main controlled frequency divider has its input connected to a pulse generator. The device further includes an auxiliary controlled frequency divider having its first input connected to the pulse generator, its second input connected to a load sensor, and its output connected to an auxiliary pulse counter whose output is connected to the comparator.

The aforesaid method and device have certain disadvantages. Between the start of integration of electric pulses and the instant a trigger pulse is produced, the phase of the motion changes considerably, for example, by 80°; the acceleration of the periodic motion may be so high as to lead to an inevitable dynamic error in producing a trigger pulse.

SUMMARY OF THE INVENTION

It is an object of the present invention to provide a method for producing trigger pulses in relation to a preset phase of motion proceeding with a continuously variable period, which would rule out a dynamic error in producing a trigger pulse.

It is another object of the invention to provide a device for producing trigger pulses in relation to a preset phase of motion proceeding with a continuously variable period, incorporating an auxiliary unit aimed at eliminating a dynamic error in producing a trigger pulse.

The first of the foregoing objects is attained by providing a method for producing trigger pulses in relation to a preset phase of motion proceeding with a continuously variable period, whereby a first control pulse is formed upon reaching a preset phase of the motion, a second control pulse is formed as the phase of the motion changes by a preset value corresponding to a fundamental time interval, and pulses are accumulated during the fundamental time interval, whereof the repetition frequency is at least one order greater than that of the control pulses, which accumulated pulses are counted until reaching a preset number, which moment marks the onset of a trigger pulse, the method being characterized, according to the invention, in that a first time interval and a second time interval are successively determined within the fundamental time interval as the phase of the motion changes by the preset value, each of the first and second time intervals corresponding to a change of the phase of the motion by such a value that the total change in the phase of the motion is equal to the change of the phase of the motion by the preset value, which is followed by determining the difference between the first and second time intervals at the end of the fundamental time interval and using the sign of this difference to correct the duration of the fundamental time interval.

The second object of the present invention is attained by providing a device for producing trigger pulses in relation to a preset phase of motion proceeding with a continuously variable period, intended for carrying out the above method and comprising a control unit having its inputs connected to an initial adjustment pulse unit and a control pulse unit, respectively, and its outputs connected to a main pulse counter and a main controlled frequency divider, respectively, which are interconnected, the main pulse counter having its output connected to a comparator, whereas the main controlled frequency divider has its input connected to a pulse generator, the device further including an auxiliary controlled frequency divider having its first input connected to the pulse generator, its second input connected to a load sensor and its output connected to an auxiliary pulse counter whose output is connected to the comparator, the device also including a unit for determining the difference between time intervals and correcting the fundamental time interval, having its first input connected to the main controlled frequency divider, its second and third inputs connected to the outputs of the control unit, and its outputs connected to the main pulse counter.

According to the invention, the correction of the fundamental time interval is effected in such a way that the dynamic error in producing a trigger pulse is negligible. Thus the invention can be used to advantage in all cases where great accelerations are encountered.

BRIEF DESCRIPTION OF THE ACCOMPANYING DRAWINGS

Other objects and advantages of the present invention will become more apparent from the following detailed description of a preferred embodiment thereof, taken in conjunction with the accompanying drawings, wherein.

DETAILED DESCRIPTION OF THE INVENTION

Figure 1:
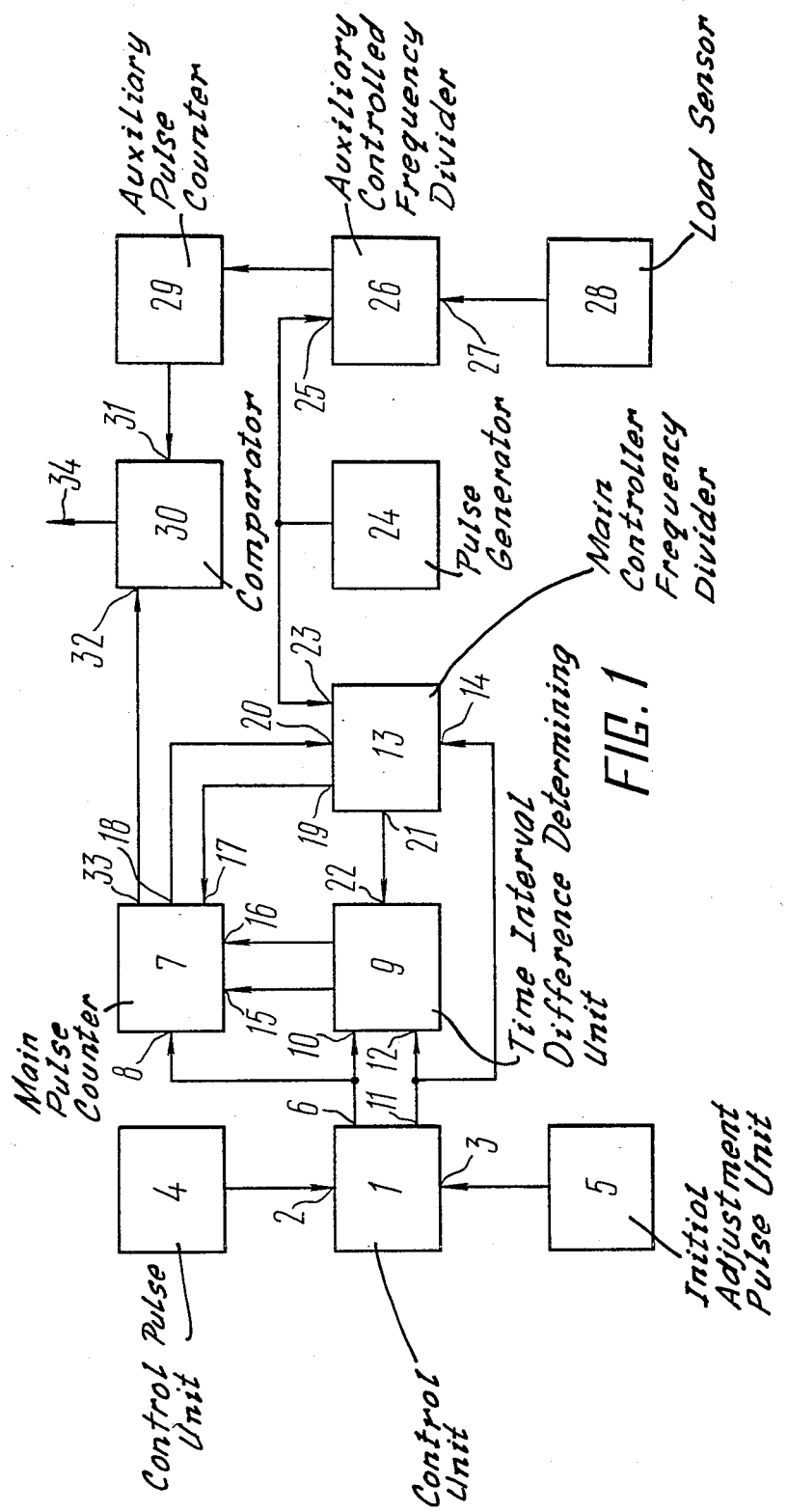
FIG. 1 is a block diagram of a device for producing trigger pulses in relation to a preset phase of motion proceeding with a continuously variable period, in accordance with the invention.

According to the invention, the method for producing trigger pulses in relation to a preset phase of motion proceeding with a continuously variable period is carried out as follows. A first control pulse is formed upon reaching a preset phase of the motion. A second control pulse is formed as the phase of the motion changes by a preset value corresponding to a fundamental time interval. A first time interval and a second time interval are then successively determined within the fundamental time interval as the phase of the motion changes by the preset value. Each of the first and second time intervals corresponds to a change in the phase of the motion by such a value that the total change of the phase of the motion is equal to the change of the phase of the motion by the preset value. The difference between the first and second time intervals is determined, and pulses are accumulated during the fundamental time interval. The repetition frequency of the pulses is at least one order greater than that of the control pulses. The duration and sign of the difference between the first and second time intervals are used to correct the number of accumulated pulses at the end of the fundamental time interval, whereupon the accumulated pulses are counted until a preset number is reached, which moment marks the onset of a trigger pulse.

A preferred embodiment of a device for carrying out the method for producing trigger pulses in relation to a preset phase of motion proceeding with a continuously variable period, in accordance with the invention is hereinafter described by way of example, and is intended to produce ignition pulses in carburetor engines.

According to the invention, the device for producing trigger pulses in relation to a preset phase of motion proceeding with a continuously variable period comprises a control unit 1 (FIG. 1), whereof inputs 2 and 3 are connected to a control pulse unit 4 and an initial adjustment pulse unit 5, respectively. A first output 6 of the control unit 1 is connected to an input 8 of a main pulse counter 7. The output 6 is also connected to an input 10 of a unit 9 for determining the difference between time intervals and correcting the fundamental time interval. A second output 11 of the control unit 1 is connected to an input 12 of the unit 9; it is also connected to an input 14 of a main controlled frequency divider 13. Outputs of the unit 9 are connected to respective inputs 15 and 16 of the counter 7. One more input 17 and one more output 18 of the counter 7 are connected to an output 19 and an input 20, respectively, of the frequency divider 13. The other output 21 of the frequency divider 13 is connected to an input 22 of the unit 9. An input 23 of the frequency divider 13 is connected to a pulse generator 24 having its output connected to an input 25 of an auxiliary controlled frequency divider 26. An input 27 of the auxiliary controlled frequency divider 26 is connected to a load sensor 28. The divider 26 has its output connected to an auxiliary pulse counter 29 whose output is connected to an input 31 of a comparator 30. A second input 32 of the comparator 30 is connected to an output 33 of the pulse counter 7. An output 34 of the comparator 30 serves as the output of the device.

Figure 2:
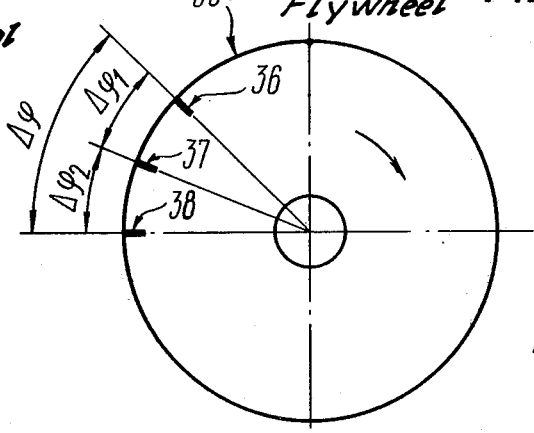
FIG. 2 is a schematic view of a flywheel of an internal combustion engine.

The units 4 and 5 are mounted on a stationary part of an internal combustion engine, such as the flywheel cover (not shown), in immediate proximity to a part which rotates synchronously with the engine shaft, such as a flywheel 35 (FIG. 2) with marks 36, 37 and 38 corresponding to phases of motion.

The spacing between the marks 36 and 37 corresponds to a change $\Delta\phi_1$ of the phase of motion; the spacing between the marks 37 and 38 is $\Delta\phi_2$, and that between the marks 36 and 38 is $\Delta\phi$.

The unit 9 for determining the difference between time intervals and correcting the fundamental time interval incorporates a flip-flop 39 (FIG. 3) whose output is connected to a control input 41 of a reversible counter 40. A counting input 42 of the counter 40 is connected to a coincidence gate 43. A first output of the counter 40 is connected to an input 45 of a flip-flop 44; two more outputs of the counter 40 are connected to inputs 47 and 48, respectively, of a switch 46. The flip-flop 44 has its output connected to a control input 49 of the switch 46; said output of the flip-flop 44 is the output 16 of the unit 9. The output of the switch 46 is the output 15 of the unit 9. A control input 50 of the flip-flop 39 and an input 51 of the coincidence gate 43 are combined into the input 10 of the unit 9. A counting input 52 of the flip-flop 39 and an input 53 of the flip-flop 44 are combined into the input 12 of the unit 9. A second input of the coincidence gate 43 is the input 22 of the unit 9.

The device for producing trigger pulses in relation to a preset phase of motion proceeding with a continuously variable period, in accordance with the invention, operates as follows.

From the output of the initial adjustment pulse unit 5 (FIG. 1), pulses are applied to the input 3 of the control unit 1, whereby the latter is set in the initial state. In response to the marks 36, 37 and 38 (FIG. 2) on the flywheel 35, the control unit 4 forms respective control pulses 54, 55 and 56 represented in FIG. 4a.

The spacing between the marks 36 and 38 (FIG. 2) corresponds to a change of the phase of the motion by a preset value $\Delta\phi$. According to the invention, the mark 37 is interposed between the marks 36 and 38 so that the control pulse 55 (FIG. 4a), formed in response to said mark 37, divides the fundamental time interval $\Delta T$ shown in FIG. 4b into intervals $\Delta T_1$ and $\Delta T_2$ (FIG. 4a) which correspond to changes of the phase of the motion by values $\Delta\phi_1$ and $\Delta\phi_2$ (FIG. 2), respectively, where $\Delta\phi_1 + \Delta\phi_2 = \Delta\phi$. From the output of the unit 4, control pulses are applied to the input 2 (FIG. 1) of the control unit 1 which forms a pulse 57 represented in FIG. 4b. The duration of the pulse 57 is equal to $\Delta T$.

Figure 4A:
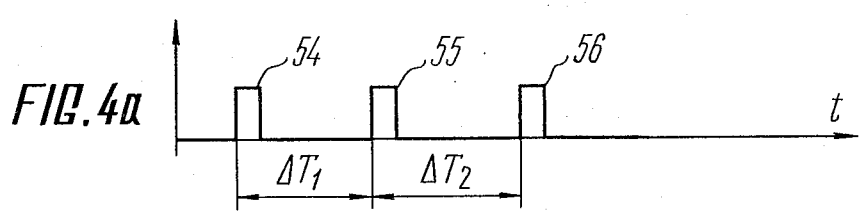
FIG. 4 shows time plots illustrating operation of the device for producing trigger pulses in relation to a preset phase of motion proceeding with a continuously variable period, in accordance with the invention.
Figure 4B:
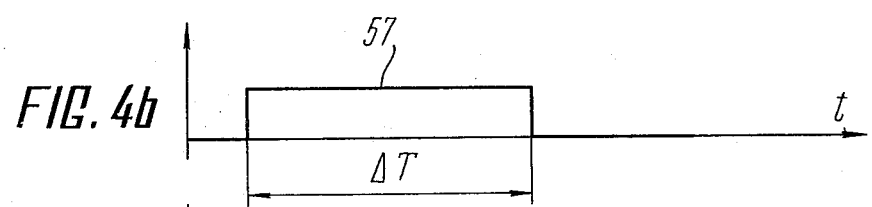
Figure 4C:
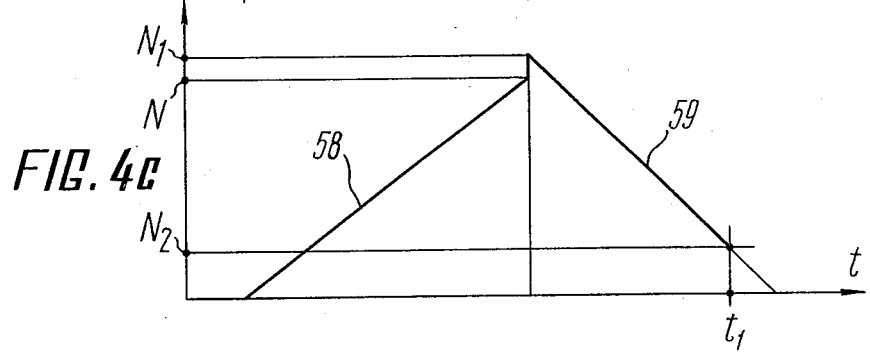

From the output 6 (FIG. 1) of the control unit 1, the pulse 57 (FIG. 4b) is applied to the input 8 (FIG. 1) of the main pulse counter 7. During the time interval ΔT (FIG. 4b), the counter 7 stores pulses applied to its input 17 (FIG. 1) from the output 19 of the main controlled frequency divider 13. In the course of a process 58 (FIG. 4c) of accumulating pulses during the time interval ΔT (FIG. 4b), the number of stored pulses reaches N (FIG. 4c). After the time interval ΔT (FIG. 4b), the unit 9 (FIG. 1) for determining the difference between time intervals and correcting the fundamental time interval corrects, through the inputs 15 and 16 (FIG. 1) of the counter 7, the number N (FIG. 4c) of pulses stored over the time interval ΔT (FIG. 4b), which is done with due regard for the value and sign of the acceleration, found from the difference between $\Delta T_1$ and $\Delta T_2$ (FIG. 4a). As a result, the number of pulses becomes $N_1$ (FIG. 4c).

The correction being over, an instruction is sent from the output 18 of the counter 7 (FIG. 1) to the input 20 of the divider 13, whereby pulses are passed from the output 19 of the divider 13 to the input 17 of the counter 7, which carry out a process 59 (FIG. 4c) of counting the pulses stored by the counter 7 (FIG. 1). The process 59 (FIG. 4c) continues until the number of pulses stored by the counter 7 (FIG. 1) is equal to $N_2$ (FIG. 4c) which is the number of pulses stored by the auxiliary counter 29. $N_2$ is determined by a signal arriving from the load sensor 28 via the auxiliary controlled frequency divider 26.

The instant $t_1$ (FIG. 4c), when the number of pulses stored by the counter 7 (FIG. 1) is equal to $N_2$ (FIG. 4c), i.e. the number of pulses stored by the counter 29 (FIG. 1), is determined by the comparator 30, its input 32 receiving information from the output 33 of the counter 7, whereas its input 31 receives information from the output of the counter 29.

The unit 9 (FIG. 1) for determining the difference between time intervals and correcting the fundamental time interval operates as follows.

Figure 3:
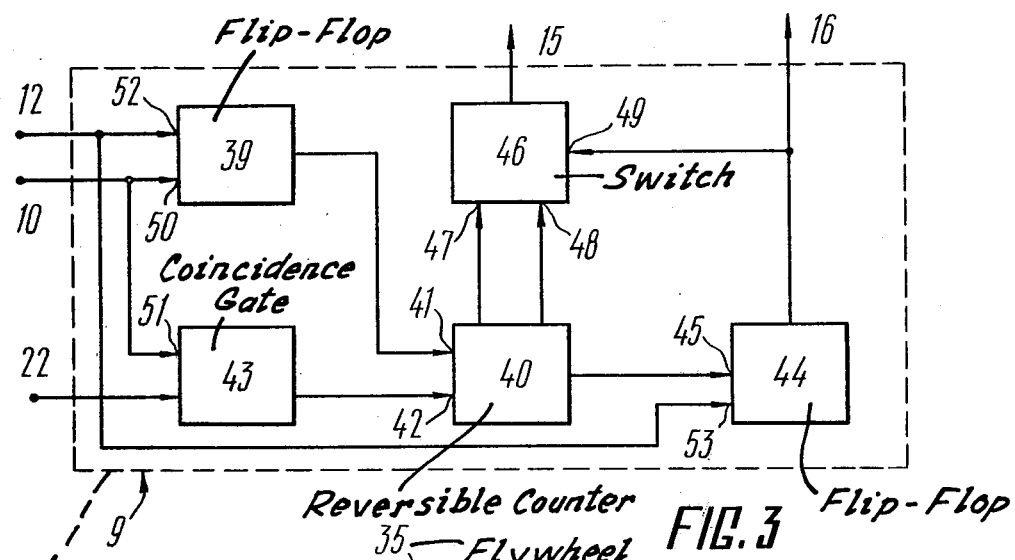
FIG. 3 is a block diagram of the unit for determining the difference between the time intervals and correcting the fundamental time interval, in accordance with the invention.

From the output 11 (FIG. 1) of the control unit 1, the control pulses 54, 55 and 56 (FIG. 4a) are applied to the counting input 52 (FIG. 3) of the flip-flop 39. The first control pulse 54 (FIG. 4a) resets the flip-flop 39 (FIG. 3). As this takes place, a signal is applied from the flip-flop 39 to the input 41 of the reversible counter 40, whereby the latter starts adding up pulses applied to its input 42 from the output of the coincidence gate 43. The gate 43 is driven into conduction for the time interval ΔT (FIG. 4b) by the pulse 57 applied to its input 51 (FIG. 3) from the output 6 (FIG. 1) of the control unit 1.

Upon the arrival of the control pulse 55 (FIG. 4a), which signifies the end of the time interval $\Delta T_1$ (FIG. 4b), the flip-flop 39 (FIG. 3) is set and makes the counter 40 subtract pulses. Upon the end of the pulse 57 (FIG. 4b), the gate 43 (FIG. 3) is cut off, and the counting of pulses is discontinued. The remainder of the pulses stored by the counter 40 is indicative of the difference between the time intervals $\Delta T_1$ and $\Delta T_2$ and, consequently, of the degree of acceleration. The sign of the acceleration is determined by the flip-flop 44 whose input 45 receives a signal of the zero state of the counter 40. The flip-flop 44 is reset by the control pulses 54, 55 and 56 (FIG. 4a) applied to its input 53 from the output 11 (FIG. 1) of the control unit 1.

From the output of the flip-flop 44 (FIG. 3), a signal is applied to the control input 49 of the switch 46, whereby a signal is passed to the input 15 of the counter 7 (FIG. 1) either from the output 47 (FIG. 3) or from the output 48 of the counter 40, depending on the sign of the acceleration.

A signal from the flip-flop 44 is also applied to the input 16 (FIG. 1) of the counter 7, whereby a certain number of pulses is either added to or subtracted from N (FIG. 4c). The number of these pulses corresponds to the difference between $\Delta T_1$ and $\Delta T_2$ (FIG. 4a); these pulses are applied to the input 15 (FIG. 1) of the counter 7 from the output of the switch 46 (FIG. 3).

The present invention provides for a more accurate timing of trigger pulses, which, in turn, accounts for a higher output of an internal combustion engine under dynamic conditions.

What is claimed is:

1. A method for producing trigger pulses in relation to a preset phase of motion proceeding with a continuously variable period, said phase of motion being changed by a preset value, said method comprising the steps of forming a first control pulse upon reaching the preset phase of motion;

forming a second control pulse as said phase of motion is changed by said preset value;

forming a fundamental time interval having a duration corresponding to the change of said phase of motion by said preset value;

determining a first time interval during said change of said phase of motion by said preset value within said fundamental time interval;

determining a second time interval during said change of said phase of motion by said preset value within said fundamental time interval, said first and second time intervals being successively determined as said phase of motion changes by such a value that the total change of said phase of motion is equal to the change of said phase of motion by said preset value;

determining the difference between said first and second time intervals;

storing additional control pulses having a repetition frequency at least one order greater than that of said first and second control pulses during said fundamental time interval;

correcting the number of said stored additional control pulses at the end of said fundamental time interval on the basis of the value and sign of said difference between said first and second time intervals;

counting said stored additional control pulses until a preset number is reached; and forming a trigger pulse at an onset determined by the instant the number of said stored additional control pulses reaches said preset number.

2. A device for producing trigger pulses in relation to a preset phase of motion proceeding with a continuously variable period, said device comprising a control unit having a first input, a second input, a first output and a second output;

a control pulse unit for producing control pulses having fundamental time intervals therebetween corresponding to changes in the phase of motion, said control pulse unit having an output connected to said first input of said control unit whereby said control unit produces a control pulse having a pulse duration;

an initial adjustment pulse unit having an output connected to said second input of said control unit;

a time interval unit for determining the difference between the time intervals of the control pulses and correcting the fundamental time interval of said pulses, said time interval unit having a first input, a second input, a third input, a first output and a second output, said first and second inputs of said time interval unit being connected to said first and second outputs, respectively, of said control unit;

a main pulse counter having a first input, a second input, a third input, a fourth input, a first output and a second output, said first input of said main pulse counter being connected to said first output of said control unit and said second and third inputs of said main pulse counter being connected to said first and second outputs, respectively, of said time interval unit whereby said main pulse counter stores a number of pulses over the duration of said control pulse as corrected by said time interval unit in accordance with the difference between said time intervals;

a main controlled frequency divider having a first input, a second input, a third input, a first output and a second output, said first input of said main controlled frequency divider being connected to said second output of said control unit and said second input and first output of said main controlled frequency divider being connected to said first output and fourth input, respectively, of said main pulse counter;

a pulse generator having an output connected to said third input of said main controlled frequency divider;

an auxiliary controlled frequency divider having a first input, a second input and an output, said first input of said auxiliary controlled frequency divider being connected to said output of said pulse generator;

a load sensor having an output connected to said second input of said auxiliary controlled frequency divider;

an auxiliary pulse counter having an input and an output, said input of said auxiliary pulse counter being connected to said output of said auxiliary controlled frequency divider; and a comparator having a first input, a second input and an output, said first input of said comparator being connected to said second output of said main pulse counter and said second input of said comparator being connected to said output of said auxiliary pulse counter.

* * * * *

UNITED STATES PATENT OFFICE
CERTIFICATE OF CORRECTION

PATENT NO. : 4,236,085
DATED : November 25, 1980
INVENTOR(S) : Viktor B. An, et al.

It is certified that error appears in the above-identified patent and that said Letters Patent are hereby corrected as shown below:

ON THE TITLE PAGE, Item (76) should read
-- [76] Inventors: Viktor B. An, rabochy poselok Krasnoobsk, 3, kv. 5; Ivan D. Bukhtiyarov, rabochy poselok Krasnoobsk, 3, kv. 157; Alexei S. Demin, rabochy poselok Krasnoobsk, 6, kv. 198; Viktor V. Kosyrev, rabochy poselok Krasnoobsk, 3 Kv. 171; Venaimin G. Potanin, rabochy poselok Krasnoobsk, 3 Kv. 12, all of Novosibirskaya oblast; Valery A. Slepchuk, Prospekt Dzerzhinskogo, 69, kv. 79, Novosibiask, all of U.S.S.R. --.

Signed and Sealed this

Thirtieth Day of March 1982

[SEAL]

Attest:

Attesting Officer

GERALD J. MOSSINGHOFF

Commissioner of Patents and Trademarks